Patented Sept. 18, 1945

2,384,848

UNITED STATES PATENT OFFICE 2,384,848

DISPERSIONS OF ETHLYENE POLYMERS

Franklin Traviss Peters, Wilmington, Del., assignor to E. I. du Pont de Nemours & Company, Wilmington, Del., a corporation of Delaware No Drawing. Application August 10, 1942, Serial No. 454,325

7 Claims. (Cl. 260—32)

This invention relates to dispersions of polymeric materials and more particularly to improved dispersions of normally solid polymers from ethylene.

The ethylene polymers used in the practice of this invention are the normally solid polymers of ethylene obtained, for example, by polymerizing ethylene in accordance with the processes described in U. S. Patents 2,153,553 and 2,188,465. These polymers can be obtained by heating ethylene, which can contain a small amount of oxygen as catalyst, at high pressures, for example, at 1000 atmospheres or above at a temperature between 100° C. and 400° C. and preferably from 150° C. to 250° C. These ethylene polymers melt at temperatures in excess of 100° C., generally within the range of about 110° C. to 200° C., and have an average molecular weight in excess of 6000. They are essentially saturated products corresponding in composition substantially to $(CH_2)_x$ and when subjected to X-ray diffraction analysis show a crystalline structure. These polymers are insoluble in xylene at ordinary temperatures but soluble in xylene at its boiling point, are unaffected by prolonged contact with air at ordinary temperatures, and are characterized by the fact that they can be formed into films and filaments which yield oriented products when cold drawn. The oriented products furnish diffraction patterns upon examination with X-rays and exhibit birefringence and parallel extinction when observed under crossed Nicol prisms. This invention is also applicable to the normally solid polymers from ethylene obtained by other methods, for instance, by the method of U. S. Patent 2,212,155 or by contacting ethylene with water and a percompound catalyst, such as diacyl peroxide, at temperatures from 40° C. to 350° C. under pressures above atmospheric and preferably in excess of 3 atmospheres.

The use of solutions of the above mentioned polymers for the formation of coatings and films is attended with serious difficulties because the polymers are inappreciably soluble below 60° C. in the only known solvents, which restricts use of such solutions to applications in which elevated temperatures can be maintained conveniently. Application of the polymer in the molten state requires even higher temperatures. Aqueous dispersions of the ethylene polymers which can be handled and applied at normal temperatures have been proposed but the products heretofore prepared have two serious disadvantages. First, in using them in the preparation of films and coatings a discontinuous powdery residue is obtained by evaporation of the water. In order to obtain a coherent film or coating this residue must be fused, which requires temperatures at least as high as 110° C. Since the viscous molten polymer does not level out readily, there is a tendency for the final film or coating to be thin and weak in places. Secondly, in order to obtain a stable aqueous dispersion relatively high concentrations of dispersing agents must be used. When the concentration of these is of the order of about 5-10% or more based on the ethylene polymer, a continuous film or coating cannot be obtained by fusing the residue because the dispersing agents are incompatible with the polymer and prevent the formation of coherent coatings. Even at lower concentrations the presence of these dispersing agents has a deleterious effect upon the strength and toughness of the coating. Dispersions of the ethylene polymer in organic liquids have also been previously suggested but the systems obtained are not adapted to casting and coating procedures because of the large and nonuniform size of the particles in these dispersions.

This invention has as an object the production of a fluid ethylene polymer composition which can be handled and applied at room temperature, which requires no dispersing agents, and which will give continuous, tough coatings or films upon evaporation at temperatures appreciably below the melting point of the polymer. A still further object resides in the production from these dispersions of strong coatings and films. Other objects will appear hereinafter.

The above objects are accomplished by a process which comprises dissolving the normally solid polymer of ethylene in a volatile hydrocarbon or chlorinated hydrocarbon solvent boiling above 80° C. but below 175° C. by heating the mixture above 110° C., and then cooling the solution slowly below 35° C. with rapid and continuous agitation.

In the preferred method of practicing the invention the ethylene polymer is mixed with part of the solvent, the mixture is heated to above 110° C. until solution is complete, the solution is removed from the source of heat and when the temperature has fallen to about 80° C. the remainder of the solvent is added rapidly with vigorous agitation, and the agitation is continued until the solution has cooled to below 35° C. The dispersions made by this method are thixotropic and exhibit to an unusually pronounced degree the phenomenon known as false body. When in a static condition, that is, when the forces being exerted on the system are of the order of magnitude of ordinary gravitational forces, these dispersions behave like a jelly or paste and when placed in a container flow slowly if at all on inversion of the container. However, if the container is shaken rapidly, these gels behave like liquids, splashing back and forth with each sudden movement of the container. In addition to the behavior of the whole body of this system as a fluid under rapid agitation, any part of the suspension directly in contact with an appreciable distorting force also behaves like a thin fluid, but only so long as the force is applied, there being no hysteresis effect. For example, when examined by touching with the fingers, the suspensions appear to have very little "body."

A further example of this thixotropic property is that the suspension can be sprayed through an ordinary spray gun of the type used for spraying paint, but only that part of the suspension which is in motion through the nozzle (or air cap) and fluid tube assembly behaves as a fluid; the major part, which is in the cup used as a reservoir, has the appearance of a paste and does not change in shape except slowly as it is pulled out of the reservoir into the feed mechanism. The fact that force, which need be only slightly greater than that of gravity, is required to make the suspension behave as a fluid and that the suspension loses its fluid characteristics as soon as the force is removed is a unique characteristic of this suspension. This property is highly desirable since after the dispersion is applied as a coating by conventional methods, such as spraying, brushing, dip coating, roller coating, or spreading, the coating resists further flowing before drying. Thus, the coated article can be maintained in a vertical position before drying and still remain smooth, uniform, and continuous. Dispersions which lack this thiotropic property tend to drain from the supporting surface. Other characterizing properties are a translucent appearance, high stability, and an individual particle size of less than 1 micron.

A dispersion of markedly different properties is obtained by the alternative procedure in which the cooling of the solution below 350° C. is not interrupted by the above mentioned addition of further solvent when the temperature of the solution has fallen to about 80° C. The resulting dispersion is fluid, is not thixotropic, and shows practically no false body. It shows a greater tendency to settling and flocculation, although it is quickly redispersed by mild agitation. In applications in which the smoothness of the coating of the dispersion before it is dried is not important and in which the coated surface can be maintained in a horizontal position to prevent drainage before drying, this method is occasionally used with advantage since it leads to a more fluid type of dispersion which can therefore be made up with higher concentrations of the ethylene polymer.

The invention is further illustrated by the following examples in which the parts are by weight.

Example I

Fifteen parts of a solid polymer of ethylene having a melt viscosity of 7,000 poises when measused at 190° C., is dissolved in 125 parts of xylene by heating and stirring under reflux at a temperature of about 140° C. After the polymer is completely dissolved, the heating is stopped and the entire body of the solution is stirred violently. When the temperature of the solution has fallen to about 80° C., 125 parts of cold xylene is added rapidly with vigorous stirring. The mixture becomes hazy at this point and there is a marked rise in its viscosity. Vigorous stirring is continued until the temperature is below about 35° C. During this cooling and stirring process the system becomes progressively hazier due to the formation of a suspension, or dispersion, of the polymer in the xylene. This dispersion is thixotropic and shows unusually pronounced false body characteristics. The particles show little tendency to settle out.

Example II

Fifteen parts of the same solid polymer of ethylene used in Example I is dissolved in 250 parts of xylene by heating and stirring under reflux at a temperature of about 140° C. After the polymer is completely dissolved the heating is stopped and the entire body of the solution is vigorously and continuously stirred until the temperature drops to about 35° C. In contrast to the dispersion containing the same ethylene polymer content made by the procedure of Example I, this dispersion is highly fluid and is not thixotropic, showing practically no false body characteristics. The particles settle out rapidly.

Example III

Fifteen parts of the solid ethylene polymer used in Example I is dissolved at a temperature of about 140° C. in 125 parts of xylene, and converted to a dispersion by the procedure described in Example II. This dispersion is more viscous as shown by mobility data than that of Example II. It is markedly more fluid, however, than that of Example I, despite the fact that it contains approximately twice the polymer concentration.

Example IV

Fifteen parts of the solid ethylene polymer of Example I is dissolved in 125 parts of toluene at about 110° C. After the polymer is completely dissolved, the heating is stopped and the entire body of the solution is vigorously stirred. When the temperature of the solution has fallen to about 80° C., 125 parts of cold toluene is added rapidly with vigorous stirring. The stirring is continued until the temperature is below about 35° C. A dispersion essentially like that of Example I is obtained, except that it is more highly viscous and shows still more pronounced false body characteristics.

Example V

Fifteen parts of a solid ethylene polymer, characterized by a melt viscosity of 3,500 poises when measured at 190° C., is dissolved in 150 parts of tetrachloroethylene by heating and stirring under reflux at about 120° C. After the polymer is completely dissolved, the heating is stopped and the entire body of the solution is stirred rapidly as it cools. When the temperature of the solution has fallen to about 80° C. 100 parts of cold tetrachloroethylene is added rapidly while vigorous stirring is continued until the temperature has fallen below about 35° C. A thixotropic dispersion is obtained.

The most satisfactory dispersions are obtained from ethylene polymers having melt viscosities at 190° C. of from 700 to about 70,000 poises. As the melt viscosity of the polymer increases, there is a greater tendency toward the formation of continuous gels rather than dispersions, but this tendency can be diminished by lowering the concentration of the polymer in the solution used in preparing the dispersion. Thus, by using relatively dilute solutions, ethylene polymers having melt viscosities considerably above the range indicated as preferred can be formed into the dispersions. Conversely, the highest concentrations of the ethylene polymer in the dispersions can be obtained through the use of ethylene polymers having the lowest melt viscosities, below the range stated as preferred. However, since the toughness of the polymer, as indicated by tensile strength, ability to cold draw, and tear resistance, increases with the melt viscosity of the sample, the dispersions made from lower viscosity polymers do not yield as durable coatings and films as do those from the higher viscosity polymers. By using ethylene polymers having a melt viscosity in the preferred range dispersions containing from about 5 to 20% solids are readily obtained.

The preferred solvents are the unsubstituted hydrocarbons since they permit somewhat higher concentrations of the ethylene polymer than do the chlorinated hydrocarbons. Of these two types of solvents, which generally have boiling points between about 80° C. and about 175° C., the best results are obtained with those boiling from about 100° C. to about 150° C. The preferred solvents include xylene, toluene, and the paraffin hydrocarbons which boil within about 100° C. to 150° C. The benzene and the paraffin hydrocarbons boiling between about 80° C. and 100° C. are somewhat less useful. The chlorinated hydrocarbons such as perchloroethylene and trichloroethylene are particularly useful in those applications where non-flammability is desired.

Rapid stirring during the cooling step is the preferred method of agitation although other methods such as shaking or turbulent flow can be used. If agitation is not used during the cooling of the solution the product resembles a gel which is appreciably more rigid than the dispersions obtained by the present process. Although this gel-like material has a weak structure it resists spreading out into films and coatings by the conventional methods applicable to the dispersions.

Any known method of cooling can be used during the stirring process, so long as it does not interfere with the necessary condition of keeping the entire body of liquid in rapid motion. Thus, the container for the solution is preferably cooled from the exterior, by air cooling or by surrounding it with a bath of liquid to dissipate the heat. It can be internally cooled with coils containing a circulating cold liquid, but these should be so constructed in relation to the efficiency of the stirring provided that none of the solution is permitted to be in a static condition in isolated parts of the container. If this occurs the static material will form a gel rather than a dispersion and will cause the final product to be lumpy and non-uniform. The formation of gel will occur also with any of the solution or partially formed dispersion which is permitted to splash onto the walls of the vessel in an area where it does not receive further agitation. If this latter occurs, the gelled, lumpy material should be prevented from mixing with the final product. This can be accomplished by removing the dispersion from the vessel through an outlet at the bottom or by removing the rim of gelled material carefully before pouring the dispersion out of the vessel.

The present dispersions can be modified by the inclusion of such materials as pigments, plasticizers, waxes, resins, agents to promote adhesion or to facilitate stripping, metal powder, and the like.

The present dispersions can be applied in a fluid condition at normal temperatures and the product obtained, after removal of the solvent above 80° C., has properties similar to those of products obtained from hot solutions or melts. This fact is a decided advantage in the industrial operations of coating and impregnating which are difficult to carry out at elevated temperature.

The dispersions described herein are particularly useful in the impregnation of paper, fabrics and other porous and semi-porous materials since the fine ethylene polymer particles fill in the interstices and thus give high adhesion and yet, since the penetration is less than in the case of a solution, do not strike through or penetrate the paper. The present dispersions are also particularly valuable for preparing finely divided solid ethylene polymer which can be isolated from the dispersion by different means including that of grinding the dry cake obtained after removal of the organic solvent.

As many apparently widely different embodiments of this invention may be made without departing from the spirit and scope thereof, it is to be understood that I do not limit myself to the specific embodiments thereof except as defined in the appended claims.

I claim:

1. A process for making dispersions of a normally solid polymer from ethylene which comprises dissolving said polymer in an organic solvent boiling between 80° and 175° C. by heating the mixture of polymer and solvent above about 110° C. and then cooling the solution slowly to below 35° C. with rapid and continuous agitation, said solvent being selected from the group consisting of hydrocarbon and chlorinated hydrocarbon solvents.

2. A process for making dispersions of a normally solid polymer from ethylene which comprises dissolving said polymer in a hydrocarbon solvent boiling between 80° and 175° C. by heating the mixture of polymer and solvent above 110° C., and then cooling the solution slowly to below 35° C. with rapid and continuous agitation.

3. A process for making dispersions of a normally solid polymer from ethylene which comprises dissolving said polymer in a chlorinated hydrocarbon solvent boiling between 80° and 175° C. by heating the mixture of polymer and solvent above 110° C. and then cooling the solution slowly to below 35° C. with rapid and continuous agitation.

4. A process for making dispersions of a normally solid polymer from ethylene which comprises dissolving said polymer in a volatile organic solvent by heating the mixture of polymer and solvent above 110° C., cooling the solution slowly with rapid and continuous agitation until the temperature of the solution has fallen between about 85° C. and 75° C., then with continuation of said agitation adding a further quantity of cold solvent and then continuing said rapid agitation until the temperature falls below 35° C., said solvent being selected from the group consisting of hydrocarbon and chlorinated hydrocarbon solvents.

5. The process set forth in claim 4 in which said solvent is a hydrocarbon solvent boiling above 80° C.

6. The process set forth in claim 4 in which said solvent is a chlorinated hydrocarbon solvent boiling above 80° C.

7. A thixotropic dispersion of a normally solid polymer of ethylene in a liquid selected from the group consisting of hydrocarbon and chlorinated hydrocarbon solvents boiling between 80° and 175° C.

FRANKLIN TRAVISS PETERS.